United States Patent
Shukh

(12) 
(10) Patent No.: US 6,594,122 B1
(45) Date of Patent: Jul. 15, 2003

(54) GMR HEAD WITH REDUCED TOPOLOGY FOR HIGH SPEED RECORDING WITH SUBMICRON TRACK WIDTH

(75) Inventor: Alexander M. Shukh, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 44 days.

(21) Appl. No.: 09/605,080

(22) Filed: Jun. 26, 2000

Related U.S. Application Data

(60) Provisional application No. 60/175,609, filed on Jan. 11, 2000.

(51) Int. Cl.[7] .............................. G11B 5/17; G11B 5/39
(52) U.S. Cl. ........................ 360/317; 360/123; 360/126
(58) Field of Search ................................ 360/317, 123, 360/126

(56) References Cited

U.S. PATENT DOCUMENTS

| | | | |
|---|---|---|---|
| 4,743,988 A | 5/1988 | Sato et al. ................ 360/126 |
| 5,283,942 A | 2/1994 | Chen et al. ................ 29/603 |
| 5,452,164 A | 9/1995 | Cole et al. ................ 360/113 |
| 5,546,650 A | 8/1996 | Dee ..................... 29/603.16 |
| 5,621,596 A | 4/1997 | Santini .................. 360/126 |
| 5,640,753 A | * 6/1997 | Schultz et al. .......... 29/603.08 |
| 5,652,687 A | 7/1997 | Chen et al. ............. 360/126 |
| 5,668,689 A | 9/1997 | Schultz et al. ........... 360/113 |
| 5,699,605 A | 12/1997 | Amin et al. ............ 29/603.14 |
| 5,793,577 A | 8/1998 | Katz et al. ............... 360/126 |
| 5,801,910 A | 9/1998 | Mallary .................... 360/126 |
| 6,154,347 A | * 11/2000 | Sasaki ..................... 350/317 |
| 6,285,532 B1 | * 9/2001 | Sasaki ..................... 360/317 |
| 6,301,085 B1 | * 10/2001 | Sato ........................ 360/317 |
| 6,317,288 B1 | * 11/2001 | Sasaki ..................... 360/126 |
| 6,333,841 B1 | * 12/2001 | Sasaki ..................... 360/317 |
| 6,337,783 B1 | * 1/2002 | Santini .................... 360/317 |
| 6,339,523 B1 | * 1/2002 | Santini .................... 360/317 |
| 6,353,995 B1 | * 3/2002 | Sasaki et al. ............ 29/603.14 |

OTHER PUBLICATIONS

U.S. Provisional Application No. 60/144,269; High Frequency Response Writer With Recessed SP and Toroidal Coils; Filed Jul. 15, 1999.

* cited by examiner

Primary Examiner—Jefferson Evans
(74) Attorney, Agent, or Firm—Kinney & Lange, P.A.

(57) ABSTRACT

A magnetic recording head having an air bearing surface includes first and second top poles, a bottom pole, a write gap layer positioned between the first top pole and the bottom pole, a first conductive coil positioned between the second top pole and the write gap layer, and a second conductive coil positioned in a recess of the bottom pole. At least a portion of the second conductive coil is positioned near the air bearing surface under the first top pole. In addition, the recess of the bottom pole is defined by a magnetic sublayer, wherein an inner surface of the magnetic sublayer does not include sharp corners near the air bearing surface.

20 Claims, 3 Drawing Sheets

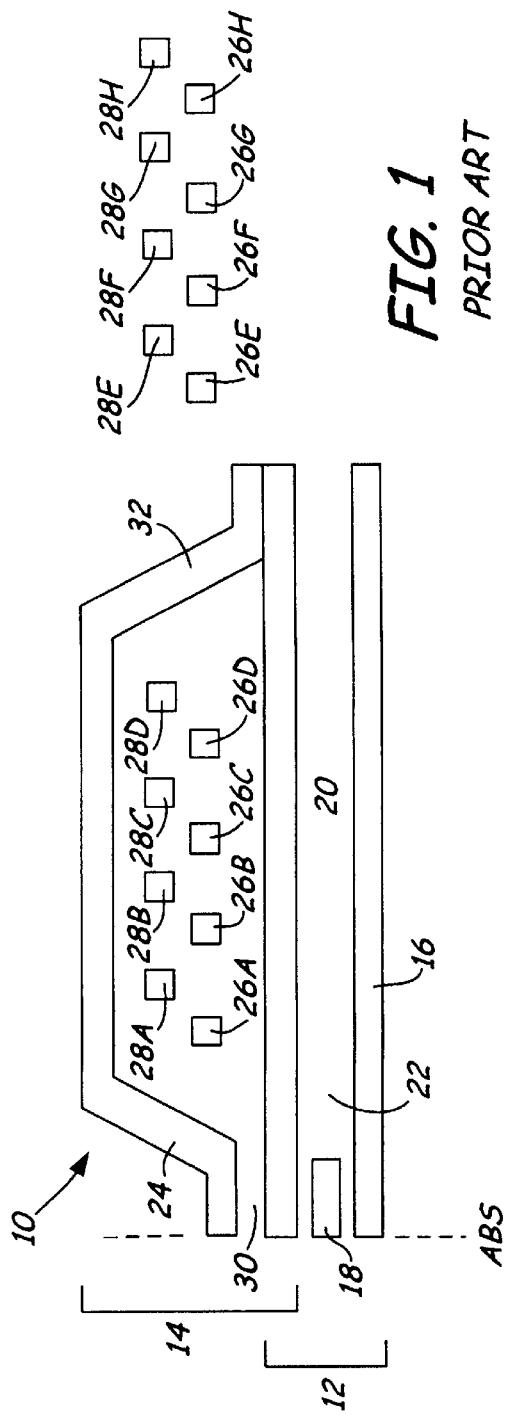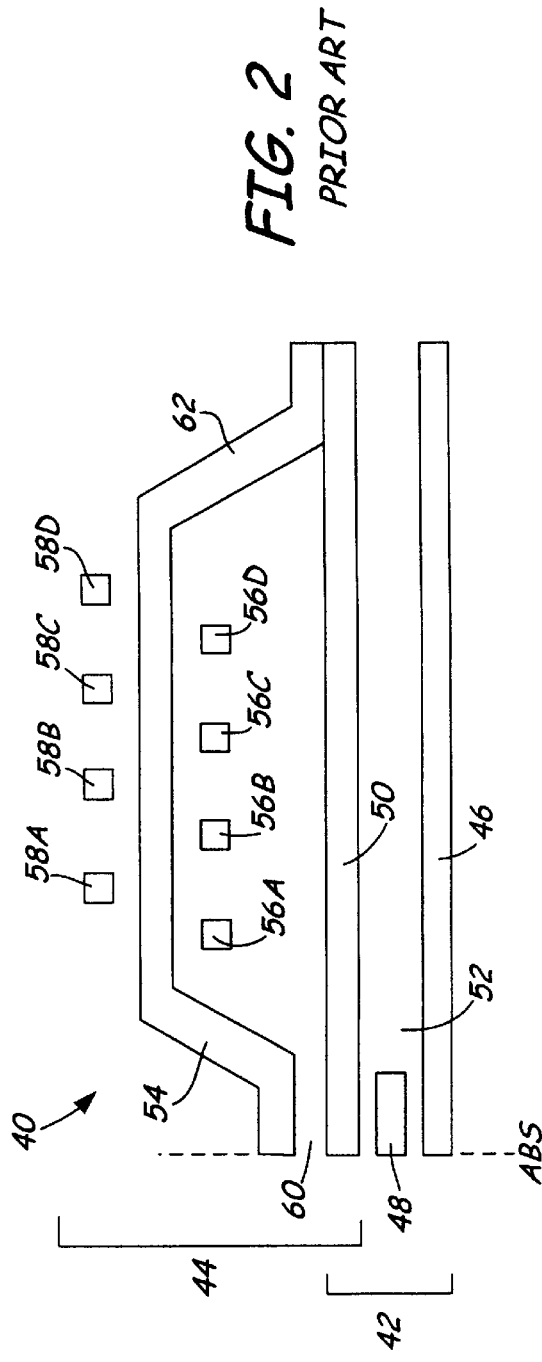

GMR HEAD WITH REDUCED TOPOLOGY FOR HIGH SPEED RECORDING WITH SUBMICRON TRACK WIDTH

CROSS-REFERENCE TO RELATED APPLICATION(S)

This application claims the benefit of the filing date of U.S. provisional application serial No. 60/175,609 entitled "GMR HEAD WITH REDUCED TOPOLOGY FOR HIGH SPEED RECORDING WITH SUBMICRON TRACK WIDTH," which was filed Jan. 11, 2000.

BACKGROUND OF THE INVENTION

The present invention relates generally to the field of electronic data storage and retrieval, and in particular to an improved writer in a merged giant magnetoresistance (GMR) read/write head.

A GMR read/write head generally consists of two portions, a writer portion for storing magnetically-encoded information on a magnetic disc and a reader portion for retrieving magnetically-encoded information from the disc. The reader portion typically consists of a bottom shield, a top shield, and a giant magnetoresistive (GMR) sensor positioned between the bottom and top shields. Magnetic flux from the surface of the disc causes rotation of the magnetization vector of a free layer of the GMR sensor, which in turn causes a change in electrical resistivity of the GMR sensor. The change in resistivity of the GMR sensor can be detected by passing a current through the GMR sensor and measuring a voltage across the GMR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the, polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

Prior art configurations have a distinct limitation in that the top pole is typically formed over a mound of coils, resulting in the top pole having a "bump" shape. The portion of the top pole adjacent the air bearing surface in prior art configurations is sloped. It is therefore difficult to precisely control the width of the top pole at the air bearing surface, particularly as the width necessarily becomes smaller to allow for greater data storage densities. Commonly assigned and co-pending provisional application No. 60/144,269, entitled "HIGH FREQUENCY RESPONSE WRITER WITH RECESSED SP AND TORROIDAL COILS", filed on Jul. 15, 1999, discloses an improved write head with a vertical coil configuration, wherein the bottom coil layer is embedded within a recess of the shared pole. By positioning the bottom coil layer in a recess in the shared pole, a substantially planar top pole may be formed.

In addition to positioning the coil in a recess in the shared pole as disclosed in provisional application No. 60/144,269, further improvements are desirable to produce a substantially planar top pole, and thereby allow for greater tolerance control of the width of the top pole at the air bearing surface.

BRIEF SUMMARY OF THE INVENTION

The present invention is a magnetic recording head having an air bearing surface. The magnetic recording head includes first and second top poles, a bottom pole, a write gap layer positioned between the first top pole and the bottom pole, a first conductive coil positioned between the second top pole and the write gap layer, and a second conductive coil positioned in a recess of the bottom pole. At least a portion of the second conductive coil is positioned near the air bearing surface under the first top pole. In addition, the recess of the bottom pole is defined by a magnetic sublayer, wherein an inner surface of the magnetic sublayer does not include sharp corners near the air bearing surface.

BRIEF DESCRIPTION OF THE DRAWINGS

FIG. 1 is a cross-sectional view of a prior art magnetic recording head having a writer portion with pancake coils.

FIG. 2 is a cross-sectional view of a prior art magnetic recording head having a writer portion with vertical coils.

DETAILED DESCRIPTION

Figure 3:
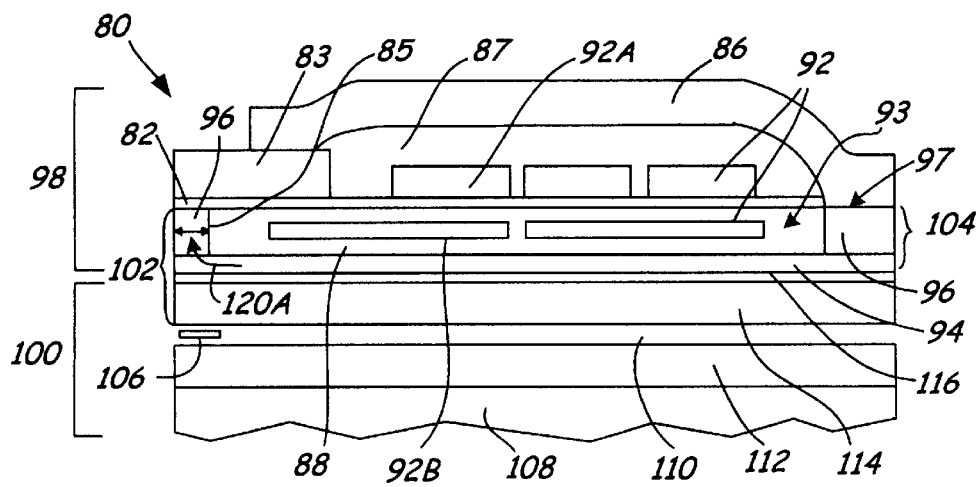
FIG. 3 is a cross-sectional view of a merged GMR read/write head according to the present invention.

FIG. 1 is a cross-sectional view of prior art magnetic recording head 10 having reader portion 12 and writer portion 14. Reader portion 12 includes bottom shield 16, read element 18, shared pole 20 and read gap 22. Read element 18 is positioned between bottom shield 16 and shared pole 20 adjacent air bearing surface (ABS) of magnetic recording head 10. Shared pole 20 acts as a top shield for reader 12 and as a bottom pole for writer 14. Read gap 22 serves to isolate read element 18 from both bottom shield 16 and shared pole 20.

Writer portion 14 includes shared pole 20, top pole 24, first pancake coil layer 26 (shown in cross-section as inner coils 26A–26D and outer coils 26E–26H), second pancake coil layer 28 (shown in cross-section as inner coils 28A–28D and outer coils 28E–28H), and write gap 30.

Inner coils 26A–26D and 28A–28D are located between top pole 24 and shared pole 20. Shared pole 20 is relatively planar in shape, while top pole 24 is bump-shaped, where the bump is defined by the layering of the inner coils between top pole 24 and shared pole 20. At the ABS of magnetic recording head 10, top pole 24 is separated from shared pole 20 by write gap 30. At a region of magnetic recording head 10 distal from the ABS, top pole 24 is in direct contact with shared pole 20 at back via 32. Top pole 24 is tapered at the ABS to define a track width of the data written to the magnetic media.

First pancake coil layer 26 is one continuous coil which wraps around back via 32 in a plane substantially normal to both the ABS of magnetic recording head 10 and to the plane of the paper of FIG. 1. In one embodiment of first pancake coil layer 26, the coils may be wrapped in the following order: 26D to 26E to 26C to 26F to 26B to 26G to 26A to 26H. Similarly, second pancake coil layer 28 is a single continuous coil which wraps around back via 32 in a plane substantially normal to both the ABS of magnetic recording head 10 and to the plane of the paper of FIG. 1. In one embodiment of second pancake coil layer 28, the coils may be wrapped in the following order: 28D to 28E to 28C to 28F to 28B to 28G to 28A to 28H. To form a single coil, rather than two coils, coil 26D may be connected to coil 28D. In this configuration of the coils, coils 26H and 28H serve as contacts to which current may be provided to the single continuous coil. Each of the individual coils 26A–26H and 28A–28H are separated from one another and from top and shared poles 24 and 20 by an insulating material.

To write magnetically-encoded data to the magnetic media, an electrical current is caused to flow through coil layers 26 and 28, thereby inducing a magnetic field across write gap 30 between top and shared poles 24 and 20. By reversing the polarity of the current through coil layers 26 and 28, the polarity of the data stored to the magnetic media is reversed.

FIG. 2 is a cross-sectional view of prior art magnetic recording head 40 having reader portion 42 and writer portion 44. Reader portion 42 includes bottom shield 46, read element 48, shared pole 50 and read gap 52. Read element 48 is positioned between bottom shield 46 and shared pole 50 adjacent the ABS of magnetic recording head 40. Shared pole 50 acts as a top shield for reader 42 and as a bottom pole for writer 44. Read gap 52 serves to isolate read element 48 from both bottom shields 46 and shared pole 50.

Writer portion 44 includes shared pole 50, top pole 54, bottom coil layer 56 (shown in cross-section as coils 56A–56D), top coil layer 58 (shown in cross-section as coils 58A–58D), and write gap 60.

Bottom coil layer 56 is positioned between top pole 54 and shared pole 50, while top coil layer 58 is positioned on a side of top pole 54 opposite bottom coil layer 56. Shared pole 50 is relatively planar in shape, while top pole 54 is bump-shaped, the bump being defined by lower coils 56 between top pole 54 and shared pole 50. At the ABS of magnetic recording head 40, top pole 54 is separated from shared pole 50 by write gap 60. At a region of magnetic recording head 40 distal from the ABS, top pole 54 is in direct contact with shared pole 50 at back via 62. Top pole 54 is tapered at the ABS to define a track width of the data written to the magnetic media.

Bottom coil layer 56 and top coil layer 58 are joined together to form one continuous vertical coil which wraps around top pole 54 in a plane substantially normal to the plane of the paper of FIG. 2. In one embodiment of bottom and top coil layers 56 and 58, the vertical coil is wrapped in the following order: 56A to 58A to 56B to 58B to 56C to 58C to 56D to 58D, wherein coils 56A and 56D serve as contacts to which current may be provided through the vertical coil. Each of the individual coils 56A–56D and 58A–58D are separated from one another and from the top and shared poles 54 and 50 by an insulating material.

To write to the magnetic media, an electrical current is caused to flow through coil layers 56 and 58, thereby inducing a magnetic field across write gap 60 between top and shared poles 54 and 50. By reversing the polarity of the current through coil layers 56 and 58, the polarity of the data stored to the magnetic media is reversed.

Both prior art writer 10 with pancake coils and prior art writer 40 with vertical coils have a distinct limitation. In both writer 10 and writer 40, respective top pole 24 or 54 is formed over a mound of coils which results in top poles 24 and 54 having a bump shape. As described above, the track width of the written data is defined by the width of the top pole at the ABS. However, with top poles 24 and 54 both being sloped near the ABS, it is difficult to control their width at the ABS of respective magnetic recording heads 10 and 40. To allow for the continuing increases in data storage densities, better control of this critical dimension is necessary.

FIG. 3 is a cross-sectional view of a merged GMR read/write head according to the present invention. Read/write head 80 is capable of supporting high-speed recording with submicron track width. Read/write head 80 includes reader portion 100 and writer portion 98. Reader portion 100 includes substrate 108, bottom shield 112, GMR sensor 106, read gap 110, and top shield 114. Bottom shield 112 is deposited on substrate 108. Bottom shield 112 and top shield 114 are preferably made of a soft magnetic material with high permeability and low magnetostriction, such as $Ni_{80}Fe_{20}$. GMR sensor 106 is positioned in read gap 110 between top shield 114 and bottom shield 112. Read gap 110 is an insulator that isolates GMR sensor 106 from top shield 114 and bottom shield 112.

Writer portion 98 is a multilayer structure that includes bottom pole 104, coil 92, write gap 82, first top pole 83 and second top pole 86. Coil 92 is a two-layer structure including top coil 92A and bottom coil 92B. The combination of bottom pole 104, non-magnetic spacer 116 and top shield 114 is also referred to as shared pole 102. Shared pole 102 serves as a top shield for reader 100 and a bottom pole for writer 98. The three-layer-structure of shared pole 102 provides high shielding and writing performance, and suppresses writer effect on reader 100. Non-magnetic spacer 116 is made of a non-magnetic insulator such as $Al_2O_3$ or $SiO_2$, or a conductor such as NiP or NiPd, and has a thickness from several dozen to several hundred nanometers. Non-magnetic spacer 116 prevents magnetic flux from propagating from writer portion 98 to reader portion 100 during recording, and enhances the magnetic stability of the sensor.

Bottom pole 104 includes bottom magnetic sublayer 94 and top magnetic sublayer 96, both of which are preferably a high moment magnetic material with low coercivity and magnetostriction, such as $Ni_{45}Fe_{55}$ or CoNiFe, to support recording on high coercivity media. A recess 93 is formed in bottom pole 104. Recess 93 is filled with a non-magnetic insulator 88, such as $Al_2O_3$. Non-magnetic insulator 88 serves as a zero throat insulator for throat height definition and improves writer efficiency. "Throat height" (TH) is the length of the pole tips measured from the ABS (i.e., the distance from the ABS to zero throat position 85). A narrow throat height is desirable in order to produce a narrow writer track width. Recess 93 is spaced from the ABS by a front portion of top magnetic sublayer 96.

Figure 4:
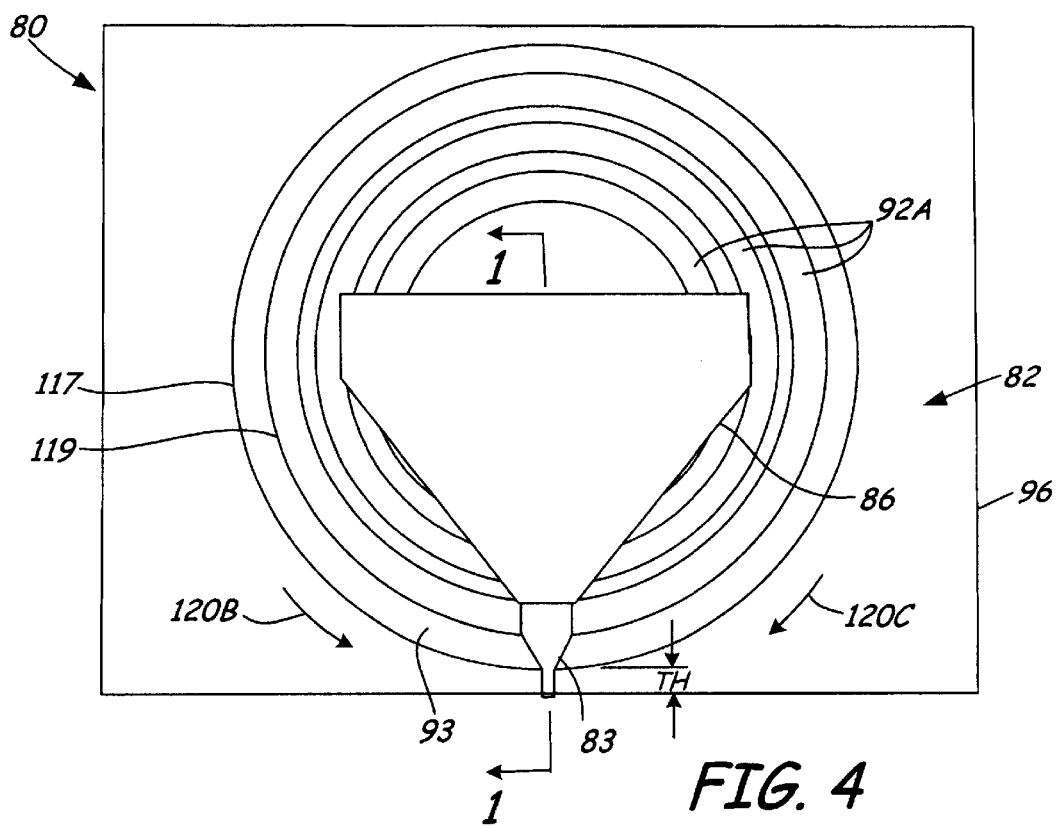
FIG. 4 shows a top view of a merged GMR read/write head according to the present invention.

Bottom coil 92B is buried in recess 93. Bottom coil 92B is in a pancake configuration, and encircles a back portion of top magnetic sublayer 96 as shown in FIG. 4. Bottom coil 92B is insulated from bottom pole 104 by non-magnetic insulator 88 and is insulated from top poles 83 and 86 by write gap 82. Bottom coil 92B is placed near the ABS, which tends to push more flux toward the ABS. Bottom coil 92B is spaced from the ABS by a front portion of top magnetic sublayer 96. External turns of bottom coil 92B are positioned under first top pole 83 near the ABS. Positioning bottom coil 92B under first top pole 83 in the vicinity of the ABS, in conjunction with using a short second top pole 86, improves the writer efficiency. Top coil 92A is positioned between write gap 82 and second top pole 86. Top coil 92A is in a pancake configuration, and encircles a back portion of second top pole 86 as shown in FIG. 4. Top coil 92A is insulated from bottom pole 104 by write gap 82 and is insulated from second top pole 86 by insulator 87, which is preferably a hard-backed photoresist. The turns of top coil 92A have a different cross-sectional shape than the turns of bottom coil 92B, but the turns of coils 92A and 92B preferably have the same cross-sectional area. Coils 92A and 92B are preferably made of Cu.

Top magnetic sublayer 96 and non-magnetic insulator 88 include a common top surface 97. Common top surface 97 is made flat by chemical-mechanical polishing (CMP). Write gap 82 is formed of a thin insulator such as $Al_2O_3$, $Si_3N_4$ or $SiO_2$ to provide insulation of coils 92A and 92B.

First top pole 83 is formed over flat polished surface 97. The planar structure of first top pole 83 allows regular photolithography to be used to pattern first top pole 83 to a submicron width near the ABS, and facilitates precise control of a long saturation region of first top pole 83 (see FIG. 4). The planar structure of first top pole 83 considerably enhances resolution of the photolithography. As a result, the geometry of top pole 83 can be controlled with high accuracy and a submicron writer width can be achieved by using photo technology.

Second top pole 86 is formed over a back portion of first top pole 83, and makes direct magnetic contact with the flared back portion of first top pole 83. Second top pole 86 is recessed from the ABS to suppress side writing/erasing of previously recorded information on adjacent trackss, which would result due to second top pole 86 being wider than first top pole 83. By positioning bottom coil 92B in recess 93 of bottom pole 104, the topology of second top pole 86 is reduced and made substantially planar. When top poles 83 and 86 are "bubble shaped" rather than substantially planar, a thick photoresist with a very high aspect ratio of the photoresist thickness to the desired pattern width must be used, which limits the resolution of the process. The planar structure of second top pole 86 gives several advantages, such as a reduction of the magnetic core length and decreased switching time, controlled domain structure, the suppression of eddy currents by being able to use sputtered magnetic materials with high magnetic moment and resistivity or laminates for top pole 86, suppression of the writer sensitivity to the write current, simplifies technology and enhances yield. These advantages are important for achieving high-speed recording.

FIG. 4 shows a top view of a merged GMR read/write head according to the present invention. The cross-sectional view shown in FIG. 3 is viewed from the perspective of section lines 1—1 in FIG. 4. Write gap 82 is shown as a transparent layer in FIG. 4, so layers below write gap 82 are visible.

As shown in FIG. 4, recess 93 is surrounded by the high moment magnetic material of top magnetic sublayer 96. Inner surface 117 of top magnetic sublayer 96 resembles the shape of the outer surface 119 of coil 92A (and coil 92B). Such a shape of top magnetic sublayer 96 enhances efficiency of writer 98 by providing a more uniform magnetic flux supply to write gap region 82 from three directions: From the bottom of write gap region 82 (as represented by arrow 120A in FIG. 3) and from both sides of write gap region 82 (as represented by arrows 120B and 120C in FIG. 4). The shape of top magnetic sublayer 96 also helps to suppress domain formation in write gap 82 and improves the magnetic stability of the GMR sensor.

First top pole 83 is patterned to a submicron width near the ABS, and broadens away from the ABS. The points at which first top pole 83 changes in width are referred to as "breakpoints". Because of the planar structure of first top pole 83, the size of the various regions of first top pole 83 defined by breakpoints may be precisely controlled.

Figure 5:
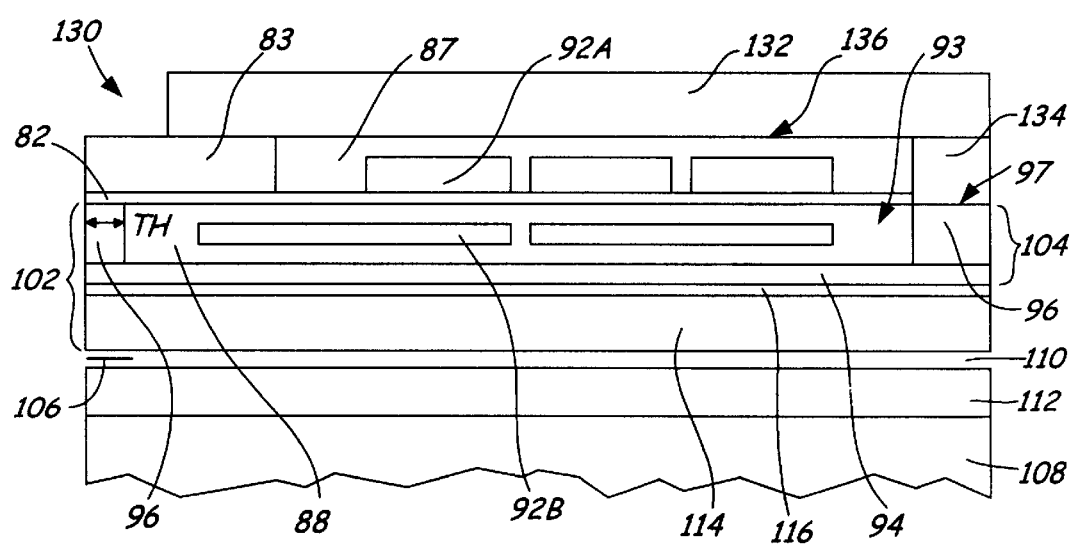
FIG. 5 shows a cross-sectional view of a second embodiment of a merged GMR read/write head according to the present invention, including a planar second top pole.

FIG. 5 shows a cross-sectional view of a second embodiment of a merged GMR read/write head 130 according to the present invention, including a planar second top pole 132. Planar second top pole 132 is formed over first top pole 83, insulator 87 and back gap closer 134. Back gap closer 134 is formed over top magnetic sublayer 96 simultaneously with the formation of first top pole 83 over write gap 82. Insulator 87 is preferably made from an inorganic material, such as $Al_2O_3$, $SiO_2$ or $Si_3N_4$. First top pole 83, insulator 87 and back gap closer 134 include a common top surface 136, which is made flat by polishing. Second top pole 132 is formed over this flat common top surface 136, resulting in a flat second top pole 132, a short core length and decreased switching time.

Although the present invention has been described with reference to preferred embodiments, workers skilled in the art will recognize that changes may be made in form and detail without departing from the spirit and scope of the invention.

What is claimed is:

1. A magnetic recording head having an air bearing surface, the magnetic recording head comprising:
   first and second top poles;
   a bottom pole having a recess;
   a write gap layer positioned between the first top pole and the bottom pole;
   a first conductive coil positioned between the second top pole and the write gap layer; and
   a second conductive coil positioned in the recess of the bottom pole, wherein the second conductive coil is significantly flatter in shape than the first conductive coil such that a portion of the second conductive coil extends near the air bearing surface under the first top pole.

2. The magnetic recording head of claim 1 wherein the second top pole is recessed from the air bearing surface.

3. The magnetic recording head of claim 1 wherein the first top pole is substantially planar.

4. The magnetic recording head of claim 1 wherein the first top pole has a width of less than one micron near the air bearing surface.

5. The magnetic recording head of claim 1 wherein the recess in the bottom pole is filled with an insulator that substantially surrounds a first portion of the second conductive coil.

6. The magnetic recording head of claim 5 wherein the shape of the recess substantially conforms to the shape of an outer surface of the second conductive coil.

7. The magnetic recording head of claim 1 wherein a top surface of the bottom pole is made substantially planar by chemical-mechanical polishing.

8. The magnetic recording head of claim 1 and further comprising an insulator formed over a first portion of the first conductive coil, and wherein a top surface of the first top pole and a top surface of the insulator are made substantially flat by polishing.

9. The magnetic recording head of claim 1 wherein a cross-sectional area of the first conductive coil is equal to a cross-sectional area of the second conductive coil.

10. The magnetic recording head of claim 1 wherein the bottom pole is incorporated in a three-layered shared pole.

11. A magnetic recording head having an air bearing surface, the magnetic recording head comprising:

first and second top poles;

a bottom pole having a recess defined by a magnetic sublayer, wherein an inner surface of the magnetic sublayer does not include sharp corners near the air bearing surface;

a write gap layer positioned between the first top pole and the bottom pole;

a first conductive coil positioned between the second top pole and the write gap layer; and a second conductive coil positioned in the recess of the bottom pole, wherein the second conductive coil is significantly flatter in shape than the first conductive coil.

12. The magnetic recording head of claim 11 wherein the second top pole is recessed from the air bearing surface.

13. The magnetic recording head of claim 11 wherein the first top pole is substantially planar.

14. The magnetic recording head of claim 11 wherein the first top pole has a width of less than one micron near the air bearing surface.

15. The magnetic recording head of claim 11 wherein the recess in the bottom pole is filled with an insulator that substantially surrounds a first portion of the second conductive coil.

16. The magnetic recording head of claim 15 wherein the inner surface of the magnetic sublayer substantially conforms to the shape of an outer surface of the second conductive coil.

17. The magnetic recording head of claim 11 wherein a top surface of the bottom pole is made substantially planar by chemical-mechanical polishing.

18. The magnetic recording head of claim 11 and further comprising an insulator formed over a first portion of the first conductive coil, and wherein a top surface of the first top pole and a top surface of the insulator are made substantially flat by polishing.

19. The magnetic recording head of claim 11 wherein a cross-sectional area of the first conductive coil is equal to a cross-sectional area of the second conductive coil.

20. The magnetic recording head of claim 11 wherein the bottom pole is incorporated in a three-layered shared pole.

\* \* \* \* \*